United States Patent [19]

Shepherd

[11] Patent Number: 5,137,787
[45] Date of Patent: Aug. 11, 1992

[54] COMPOSITE PLASTIC PANEL AND METHOD FOR PRODUCING SAME

[75] Inventor: Charles E. Shepherd, Houston, Tex.

[73] Assignee: C. E. Shepherd Company, Inc., Houston, Tex.

[21] Appl. No.: 437,843

[22] Filed: Nov. 17, 1989

[51] Int. Cl.⁵ ............... B32B 27/36; B32B 27/40; C09J 5/02
[52] U.S. Cl. ............... 428/423.7; 156/307.3; 428/424.2; 428/424.4; 428/910
[58] Field of Search ............... 428/423.7, 424.2, 424.4; 156/307.3

[56] References Cited

U.S. PATENT DOCUMENTS

| | | | |
|---|---|---|---|
| 3,071,180 | 1/1963 | Finger et al. | 156/519 |
| 4,101,475 | 7/1978 | Stalego | 156/307.3 |
| 4,362,585 | 12/1982 | de Antonis et al. | 156/62.2 |
| 4,376,834 | 3/1983 | Goldwasser et al. | 521/159 |
| 4,377,617 | 3/1983 | Ikei et al. | 428/214 |
| 4,567,236 | 1/1986 | Goldwasser et al. | 525/127 |

FOREIGN PATENT DOCUMENTS 0901410  5/1972  Canada ............... 428/423.7

Primary Examiner—Paul J. Thibodeau
Assistant Examiner—D. S. Nakarani
Attorney, Agent, or Firm—Foley & Lardner

[57] ABSTRACT

An improved composite plastic panel is disclosed, including a base layer comprising a thermoplastic or thermoset resin, which may be reinforced, and a protective surface layer comprising a polyurethane polymer having a glass transition temperature of at least 80° C. The protective layer forms a strong polar bond with the base layer. Thus, the composite plastic panel displays high water and weather resistance and has an increased useful lifespan.

20 Claims, 3 Drawing Sheets

COMPOSITE PLASTIC PANEL AND METHOD FOR PRODUCING SAME

BACKGROUND OF THE INVENTION

The invention relates to a composite plastic panel. More particularly, the invention relates to a composite plastic panel having a protective surface film which is more securely bonded to the base layer as compared to known panels, and to a method for producing such a panel.

It is known to produce plastic panels, in particular panels formed from resins comprising reinforcements such as fiberglass, which have surface films bonded thereto. In the conventional process for manufacturing plastic panels, a first layer, such as a release sheet, generally forming a continuous web, is coated with a thermoset or thermoplastic resin, typically a polyester resin. A reinforcing material may be incorporated into the resin in the form of powders, single or multiple fibers, woven or matted strands or fabric materials.

The composite reinforced resin is covered with a second layer, which may be a film, forming an envelope with the first layer. The envelope containing the liquid resin composition is then formed into the desired shape using techniques commonly known to the industry. The resin/composite matrix is subsequently cured within this film envelope. After the resin has substantially cured, one or both of the layers are removed from the finished reinforced composite plastic panel and recycled or discarded.

Problems can arise when such plastic panels are exposed to moisture, heat, ultraviolet light and abrasion. For example, glass fibers in fiberglass panels may bloom due to the action of moisture, ultraviolet light and heat, resulting in up to a 50% reduction in panel tensile strength. The fiberglass sheet itself may absorb moisture through the surface film or through the edges of the panel. Poor abrasion resistance of some resins results in scratches and other surface defects during manufacturing and installation. These can accelerate panel failure by exposing the reinforcing material to moisture, which may cause it to become separated from the resin binder. Ultraviolet light exposure causes depolymerization and embrittlement of the resin, and also film yellowing, which creates serious light transmission problems in applications on clear panels. While some materials withstand these effects better than others, the majority eventually lose physical properties and appearance characteristics to such an extent that they are no longer useful for their intended applications.

Current practices for bonding a film to a plastic panel have proved inadequate. In particular, the chemical or mechanical bonds of conventional bondable films frequently break down over time, causing the film to discolor, flake off or peel away from the resin surface. Differences in the coefficients of expansion of the plastic sheet and the film also lead to delamination. Separation between the reinforcing film and the core materials results in loss of tensile strength, flexural modulus, impact strength and light transmission properties.

SUMMARY OF THE INVENTION

Accordingly, it is an object of the present invention to provide a composite plastic panel in which the bonding strength between the base layer and the protective surface film is improved.

Another object of the present invention is to provide a composite plastic panel having excellent water resistance and weatherability and an extended useful life.

A further object of the present invention is to provide a process for producing such a plastic In accomplishing the foregoing objectives, there has been provided, in accordance with one aspect of the present invention, a composite plastic panel comprising a base layer which comprises a thermoset or thermoplastic resin, and a protective layer which comprises a film comprising a polyurethane polymer having a glass transition temperature ($T_g$) of at least 80° C. Preferably the isocyanate content of the polyurethane is at least 28 wt%. In a preferred embodiment, the resin layer has incorporated therein a reinforcing material such as glass fibers.

In accordance with another aspect of the present invention there is provided a process for forming a composite plastic sheet material comprising the steps of providing a first layer, coating a surface of the first layer with a resin to form a base resin layer, applying to the base resin layer a second film layer to form an envelope structure, and curing the envelope structure such that a polar bond is formed between the base resin layer and the second film layer, wherein the second film layer comprises a polyurethane polymer having a glass transition temperature of at least 80° C. In a preferred embodiment, the first layer is also a film comprising a polyurethane polymer with a $T_g$ of at least 80° C., and a like polar bond is formed between the base resin layer and the first film layer.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawing in which.

DETAILED DESCRIPTION OF PREFERRED EMBODIMENTS

Figure 1:
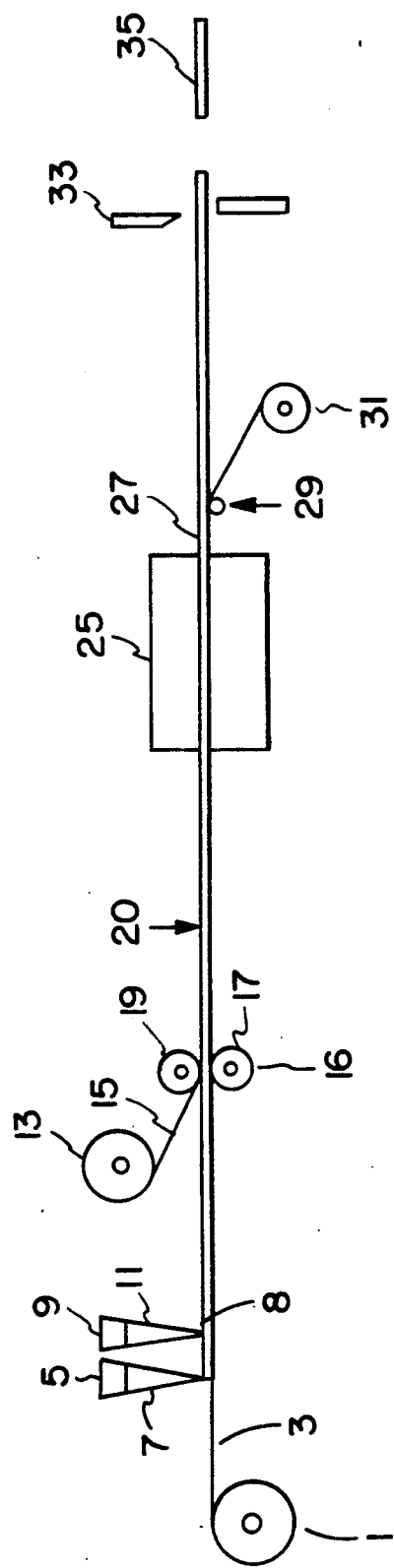
FIGS. 1-3 are diagrams of preferred methods for producing plastic panels according to the invention. Like numbers are used throughout to indicate like features.

The improved bonding strength between the protective film layer and the base resin layer of the plastic panel according to the invention results from the strong hydrogen bonding between the urethane groups of the film and the base layer, in addition to the usual chemical and mechanical bonding. This strong polar bond between the film and base layer is not affected by moisture, ultraviolet light or heat. The high bond strength, combined with the high modulus of elasticity and high abrasion resistance of the protective film, yields a composite plastic panel which displays improved weatherability and water resistance, UV light resistance and color stability. The high weatherability of the protective film layer results in reduced pitting, eroding, chalking and other surface degradation which causes undesirable appearance and reduced light transmission.

The protective film used in the panel according to the invention comprises a polyurethane polymer having a glass transition temperature ($T_g$) of at least 80° C. The relatively high glass transition temperature of the polymer is characteristic of a rigid polyurethane, in which the hard segment dominates the soft segment, rather than an elastomeric polyurethane, in which the soft segment is dominant. The rigid polyurethanes useful in the plastic panels according to the invention are relatively polar materials, with a high proportion of urethane groups, and therefore have a high capability for forming hydrogen bonds.

In addition to having a $T_g$ of at least 80° C., the polyurethane used to form the protective film must be stable at the temperatures used to cure the composite plastic panel, typically 300° to 350° F. (150° to 175° C.).

The urethanes in the film according to the invention preferably are primarily aliphatic urethanes, as aliphatic urethanes confer high water and weather resistance and a high modulus of elasticity. Aromatic urethanes may also be used.

The protective film used in accordance with the invention may further comprise other groups capable of forming hydrogen bonds, such as esters or amides, in addition to the urethane groups. Films comprising ester or amide groups will form strong hydrogen bonds to the plastic base layer of the composite plastic panel. However, the presence of urethane groups in the protective film is necessary in order to achieve the other improvements in the properties of the composite plastic panel according to the invention, such as improved water, weather and abrasion resistance, UV absorption and color stability.

The protective layer according to the invention is highly moisture resistant, having less than about 0.1% water absorption. This high moisture resistance acts to protect the mechanical strength of the resin layer and to inhibit separation.

The protective film may further comprise an acrylic polymer which is incompatible with the polyurethane. The addition of the acrylic polymer serves to increase impact resistance.

The damaging effects of ultraviolet light on the resin material of the base layer, causing depolymerization and embrittlement thereof, are significantly reduced by the ultraviolet light absorption properties of the film layer according to the invention. The protective layer itself is also very light-stable, in contrast to films formed from polyester resins, which are not normally light-stable. Furthermore, the polyurethane of the protective layer according to the invention has a very low color change due to UV exposure, compared to polyester film layers. That is, the polyurethane remains closer to its original color than polyesters, which typically form color bodies unless UV absorbers are added. Thus, problems such as film yellowing are avoided. While the ultraviolet radiation absorption of the protective film is excellent on its own, additional UV absorbers may be added if desired for further protection of the base resin layer.

The protective film may also optionally include colorants such as dyes or pigments. Colorants provide additional protection to the resin base layer against UV radiation. Colored protective films also allow the use of less expensive random-color resins for panel manufacture.

The protective film may also be printed, embossed or textured to provide the desired surface appearance and properties for particular applications.

Two preferred polyurethane resins for use in the protective film according to the invention are Isoplast ®"301" and "101", both available from Dow Chemical Co. Isoplast ® "301" is the reaction product formed from 4,4'-methylene diphenyl diisocyanate, 1,6-hexanediol, cyclohexanedimethanol and polytetramethylene glycol, prepared according to U.S. Pat. No. 4,376,834, and forms a clear film. The isocyanate content is 28 wt%. Other similar resin formulations disclosed in U.S Pat. No. 4,376,834 having the requisite $T_g$ are also suitable for use as protective films in the plastic panel according to the invention. Isoplast ® "101"a comprises the reaction product formed from 4,4'-methylene diphenyl diisocyanate, 1,6-hexanediol and a polyoxyethylene-oxypropylene polyol, and further comprises an acrylic polymer additive which improves the impact resistance of the film. The isocyanate content of the resin is 29 wt%. The polyurethane resin is formed according to U.S. Pat. No. 4,567,236, and produces an opaque film. Other resin formulations disclosed in U.S. Pat. No. 4,567,236 with the appropriate glass transition temperature are also suitable for use as protective films in the plastic panel according to the invention.

Many other polyurethane resins are also suitable for use in forming the protective layers according to the invention. The exact proportions of the various ingredients used to produce the polyurethanes are relatively unimportant, as long as the polyurethane has a $T_g$ of at least 80° C.

The selected polyurethane resin is extruded into a film form using technology currently known to the art. The extrusion process will produce a thin film material which can be wound in roll form for use in manufacturing the plastic panel according to the invention. The thickness of the film will be selected according to the contemplated use of the panel, but preferably is about 0.0005 to 0.005 inch (0.5 to 5 mils). The film optionally may be oriented in a single or double axis by technology currently known to the art.

With reference now to the drawings, FIG. 1 illustrates a preferred method for producing plastic panels according to the invention. A first film roll 1 provides a first film 3, here a release sheet. A hopper or other supply means 5 supplies a liquid thermoplastic or thermoset resin 7 to the upper surface of the first film 3, forming a liquid resin layer 8. A second hopper or supply means 9 subsequently supplies reinforcement material 11, which may be glass fibers or other standard materials, to the liquid resin layer 8. Multiple supply means may optionally be provided for both the liquid resin and the reinforcement material.

Second film roll 13 next supplies second film 15, the protective polyurethane film layer, to the top of the liquid resin layer 8, forming an envelope 20 together with the first film layer 3 for the liquid resin layer. A two-roll compression stack 16 comprising sizing rollers 17 and 18 meters the liquid resin layer 8 as the second film layer 15 is applied thereto forming the envelope 20.

Control of the viscosity of the liquid resin 7 is important in achieving a strong bond between the resin layer 8 and the protective film layer 15. Low viscosity resins increase the wetting effect on the film. Complete surface contact between the film and the resin layer is essential in order to achieve the maximum hydrogen bonding effect. High viscosity resins typically achieve less surface wetting and therefore a lower total bond strength between the film and panel. Resin viscosity values in the range of about 200 to 500 centipoise are desirable for maximum bonding effect.

Pressure applied to the envelope 20 by stack 16 during the final liquid phase enhances the bond uniformity and quality by removing entrapped air from the resin composition. Roll pressures of 3-10 pounds per linear inch are typically necessary for the resin to become completely applied to the film layer 15 prior to reaching bonding temperature during the curing phase of the process.

The envelope 20 then passes through curing oven 25. Bonding between the film layer 15 and the resin layer 8 will begin when the resin temperature reaches the glass transition temperature of the film layer 15. As the resin temperature increases during the curing (reactive) process, the film and the resin tend to form a strong polar bond, as well as chemical/mechanical bonds. Resin temperatures between about 300° and 350° F. are desirable for maximum bonding potential between the film 15 and the resin layer 8.

After emergence from the curing oven 25, the release sheet 3 is removed from the resin layer 8 of the cured composite structure 27 by stripping means 29, and is rewound on roll 31. The cured composite structure 27 is allowed to cool before being cut by cutting means 33 to form panel 35 having the desired size and configuration. The film 15 has now formed a strong polar bond with the panel base resin layer 8 of panel 35.

Figure 2:
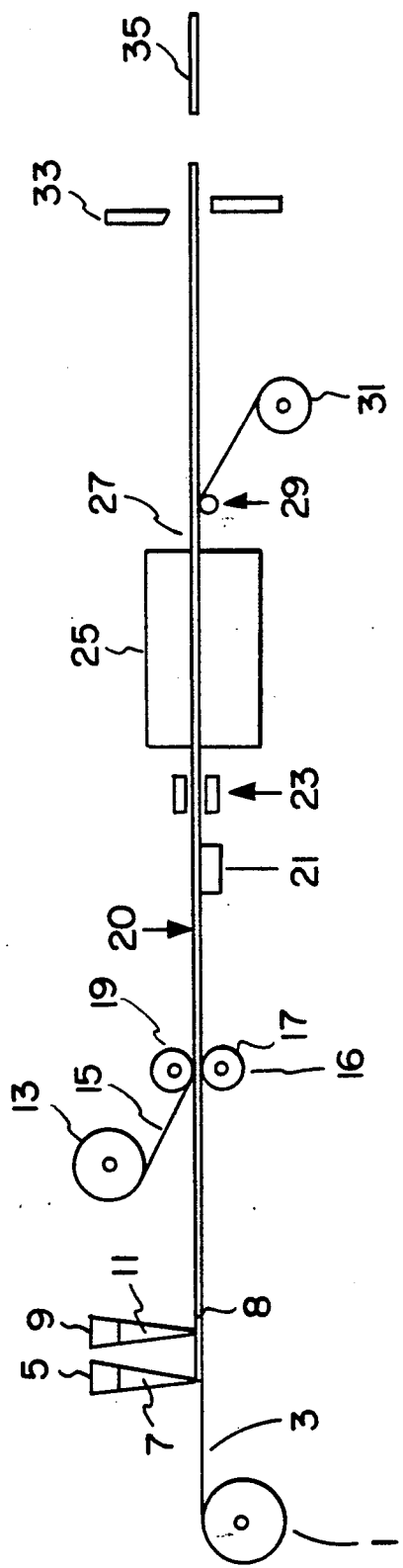

If it is desired to shape the envelope 20, for example to impart a corrugated cross-section to the finished plastic panel, this may be accomplished in the standard way. In FIG. 2, contact heat source 21 partially cures the resin layer 8 in the envelope 20 in order to provide it with sufficient strength to be formed by forming tool 23. The envelope 20 is then cured as described above.

Figure 3:
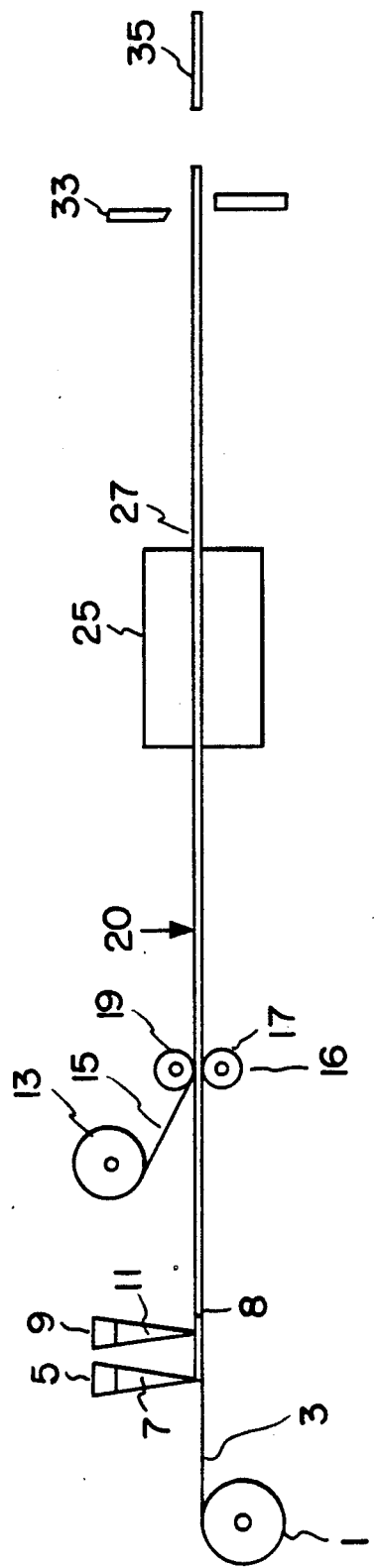

In another preferred embodiment shown in FIG. 3, first film 3 is a polyurethane film of the same composition as second film 15. First film 3 may optionally be a polyurethane film having a composition different from that of second film 15. In this embodiment, bonding occurs between the resin layer 8 and both of the film layers 3 and 15, producing a plastic panel having a protective layer on each side. No release sheet is necessary in this case. Thus, there is no chance of surface damage to the plastic material caused by the removal of the layer 3, which can result in removal of small pieces of resin from the surface of the panel. Moreover, there is no recovery or disposal cost associated with the use of layer 3, as the film now becomes part of the finished product. This embodiment also offers a practical advantage over use of a release sheet. Some state governments impose use taxes on all manufacturing materials which do not become part of the finished product. According to the invention, manufacturing costs will be reduced due to avoidance of such taxes normally applied to conventional release sheets.

The plastic panel according to the invention has a much longer useful life than panels presently known. Based on standard weathering tests, the lifespan of the inventive panel can be expected to be approximately 20 years. In contrast, after about 1 year of exposure to weather, known polyester panels begin to exhibit surface degradation occurs, while after 3-5 years, degradation becomes severe.

What is claimed is:

1. A composite plastic panel comprising a base layer which comprises a thermoset or thermoplastic resin, and a protective layer which comprises a film comprising a polyurethane polymer having a glass transition temperature of at least 80° C. said protective layer being thermally stable up to at least 150° C. and having less about 0.1% water absorption.

2. A plastic panel as claimed in claim 1, wherein said polyurethane polymer comprises at least 28 wt% of isocyanate units.

3. A plastic panel as claimed in claim 1, wherein said polyurethane polymer is the reaction product of 4,4'-methylene diphenyl diisocyanate, 1,6-hexanediol, cyclohexanedimethanol and polytetramethylene glycol.

4. A plastic panel as claimed in claim 1, wherein said polyurethane polymer is the reaction product of 4,4'-methylene diphenyl diisocyanate, 1,6-hexanediol and a polyoxyethylene-oxypropylene polyol.

5. A plastic panel as claimed in claim 4, wherein said film further comprises a second polymer which is incompatible with said polyurethane polymer.

6. A plastic panel as claimed in claim 5, wherein said second polymer is an acrylic polymer.

7. A plastic panel as claimed in claim 1, wherein said film further comprises a colorant or a UV absorbant.

8. A plastic panel as claimed in claim 1, wherein said film is oriented in a single or double axis.

9. A plastic panel as claimed in claim 1, further comprising a second protective layer on the side of said base resin layer opposite the first protective layer, wherein said second protective layer comprises a polyurethane polymer having a glass transition temperature of at least 80° C.

10. A plastic panel as claimed in claim 9, wherein the composition of said second protective layer is the same as the composition of said first protective layer.

11. A plastic panel as claimed in claim 1, wherein said resin is a polyester resin.

12. A plastic panel as claimed in claim 1, wherein said base resin layer further comprises a reinforcing material.

13. A plastic panel as claimed in claim 12, wherein said reinforcing material is glass fiber.

14. A process for forming a composite plastic sheet material comprising the steps of:
providing a first film layer;
coating a surface of said first film layer with a liquid thermoplastic or thermoset resin to form a base resin layer;
applying to said resin layer a second film layer to form an envelope structure; and
curing said envelope structure such that a polar bond is formed between said base resin layer and said second film layer,
wherein said second film layer comprises a polyurethane polymer having a glass transition temperature of at least 80° C. and is thermally stable up to at least 150° C. and has less than about 0.1% water absorption.

15. A process as claimed in claim 14, further comprising the step of adding to said base resin layer a reinforcing material before applying said second layer to said base resin layer.

16. A process as claimed in claim 15, wherein the viscosity of said liquid resin is about 200 to 500 centipoise.

17. A process as claimed in claim 14, wherein said first film layer comprises a polyurethane polymer having a glass transition temperature of at least 80° C., and said curing step produces polar bonding between said base resin layer and said first film layer.

18. A plastic panel produced by the process as claimed in claim 14.

19. A plastic panel produced by the process as claimed in claim 15.

20. A plastic panel produced by the process as claimed in claim 17.

* * * * *